United States Patent
Yamamoto et al.

(10) Patent No.: US 9,509,007 B2
(45) Date of Patent: Nov. 29, 2016

(54) METHOD OF TRANSFERRING CATALYST LAYER AND JIG USED THEREFOR

(71) Applicant: NISSAN MOTOR CO., LTD., Kanagawa (JP)

(72) Inventors: Masaya Yamamoto, Yokosuka (JP); Kenichi Toyoshima, Yokohama (JP); Kei Ono, Yokohama (JP); Norifumi Horibe, Fujisawa (JP); Takayuki Terasaki, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/412,332

(22) PCT Filed: Jun. 24, 2013

(86) PCT No.: PCT/JP2013/067272
§ 371 (c)(1),
(2) Date: Dec. 31, 2014

(87) PCT Pub. No.: WO2014/007101
PCT Pub. Date: Jan. 9, 2014

(65) Prior Publication Data
US 2015/0171450 A1 Jun. 18, 2015

(30) Foreign Application Priority Data
Jul. 2, 2012 (JP) ................. 2012-148791

(51) Int. Cl.
*H01M 8/10* (2016.01)
*H01M 4/88* (2006.01)

(52) U.S. Cl.
CPC ............... *H01M 8/10* (2013.01); *H01M 4/88* (2013.01); *H01M 8/1004* (2013.01); *Y02E 60/521* (2013.01); *Y10T 29/53135* (2015.01)

(58) Field of Classification Search
CPC ......... H01M 8/10; H01M 4/88; B28B 11/10; B29C 43/00
USPC ......................................................... 429/535
See application file for complete search history.

(56) References Cited

U.S. PATENT DOCUMENTS

2009/0214692 A1  8/2009  Chang et al.
2013/0276975 A1  10/2013  Nagasaka et al.

FOREIGN PATENT DOCUMENTS

GB     1074020 A     6/1967
GB     1089582 A     11/1967
(Continued)

OTHER PUBLICATIONS

Kunisa JP 2003-036862. Jul. 2, 2003. English machine translation by JPO.*

*Primary Examiner* — James Lee
(74) *Attorney, Agent, or Firm* — Young Basile Hanlon & MacFarlane, P.C.

(57) ABSTRACT

A transferring method for transferring a catalyst layer to a desired position on an electrolyte film includes the following processes. A multi-layer body is formed by stacking base materials and an electrolyte film on one another such that catalyst layers formed on the base materials are brought into contact with the electrolyte film. The multi-layer body is pressed from a stacking direction. The multi-layer body is heated to a first temperature. The heating is stopped after a predetermined time passes from when pressing is started. The pressing is stopped when the temperature of the catalyst layers becomes a second temperature or lower, which is a temperature lower than the first temperature, after the heating is stopped.

4 Claims, 4 Drawing Sheets

(56) References Cited

FOREIGN PATENT DOCUMENTS

| | | |
|---|---|---|
| JP | 2964659 B2 | 10/1999 |
| JP | 2003036862 A | 2/2003 |
| JP | 2004303627 A | 10/2004 |
| JP | 2005158518 A | 6/2005 |
| JP | 2006156036 A | 6/2006 |
| JP | 2009206074 A | 9/2009 |
| JP | 2010251012 A | 11/2010 |
| JP | 2011090911 A | 5/2011 |
| JP | 4784077 B2 | 9/2011 |
| JP | 2012121155 A | 6/2012 |

* cited by examiner

METHOD OF TRANSFERRING CATALYST LAYER AND JIG USED THEREFOR

CROSS REFERENCE TO RELATED APPLICATION

The present application claims priority to Japanese Patent Application No. 2012-148791, filed Jul. 2, 2012, incorporated herein in its entirety.

TECHNICAL FIELD

The present invention relates to a method of transferring a catalyst layer and a jig used for the method.

BACKGROUND

In recent years, according to social demands and movements arising from energy and environmental issues, a fuel cell capable of being operated at room temperature to obtain high power density has been attracting attention as a power source for electric vehicles and as a stationary power source. A fuel cell is a clean power generation system whose byproduct generated by an electrode reaction is water in principle and whose load on the global environment is small. In particular, the polymer electrolyte fuel cell (PEFC) is anticipated to be a power source for electric vehicles because the PEFC is operated at a relatively low temperature.

The PEFC includes an electrolyte film, catalyst layers formed on both surfaces of the electrolyte film, and a Membrane Electrode Assembly (hereinafter, referred to as an MEA) having a gas diffusion layer (GDL) or the like. A fuel cell is formed of a plurality of MEAs being stacked on one another and sandwiched between separators.

In regard to MEA production, as a technology for forming electrode catalyst layers on both surfaces of an electrolyte film, a method of performing transfer printing on a catalyst layer formed on a catalyst transfer film to an electrolyte film from the catalyst transfer film (decal method, for example, see Japanese Unexamined Patent Application 2010-251012) is known. The catalyst transfer film can be produced by coating a base material such as a plastic film or the like with a catalyst and drying the coated film.

In a method disclosed in Japanese Unexamined Patent Application 2010-251012, a catalyst layer is transfer-printed on an electrolyte film by stacking catalyst transfer films respectively produced for an anode and a cathode on both surfaces of the electrolyte film such that the catalyst layer is in contact with the electrolyte film and then by performing heat pressing using a press machine.

SUMMARY

However, in the method disclosed in Japanese Unexamined Patent Application 2010-251012, even in a case where the catalyst transfer film and the electrolyte film are accurately positioned and then set in the press machine, the electrolyte film may be deformed due to heat or drying by the heat. In such a state, there is a problem in that the transfer position of the catalyst layer with respect to the electrolyte film is displaced and, as a result, the battery performance of the fuel cell including the completed MEA is degraded.

In light of the above-described problem, an object of the present invention is to provide a transferring method capable of transferring a catalyst layer to a desired position on an electrolyte film by preventing transfer position displacement or transfer failure of the catalyst layer and to provide a jig used for the method.

A method of transferring a catalyst layer includes the following processes. A multi-layer body is formed by stacking base materials and an electrolyte film on one another such that catalyst layers formed on the base materials are brought into contact with the electrolyte film. The multi-layer body is pressed from a stacking direction. The multi-layer body is heated to a first temperature. The heating is stopped after a predetermined time passes from when pressing is started. The pressing is stopped when the temperature of the catalyst layers becomes a second temperature or lower, which is a temperature lower than the first temperature, after the heating is stopped.

A jig includes a positioning member and a holding member. The positioning member positions the base materials and the electrolyte film to be stacked as the multi-layer body using a frame-like inner wall such that the base materials and the electrolyte film are arranged at the same position when seen from the stacking direction. The holding member holds the multi-layer body from the stacking direction and transmits pressing force caused by an independent pressing apparatus to the multi-layer body.

DESCRIPTION OF EMBODIMENTS

Hereinafter, embodiments of the present invention will be described with reference to accompanying drawings. Further, the same elements are denoted by the same reference numerals in the description of the drawings and redundant description is not repeated. Further, the dimensional ratios of drawings are exaggerated for convenience of description and are different from the actual ratios in some cases.

In the present embodiment, in regard to a production process of a membrane electrode assembly (MEA) constituting a fuel cell, particularly, a process and a structure for forming (transferring) catalyst layers on both surfaces of an electrolyte film will be described.

Figure 1:
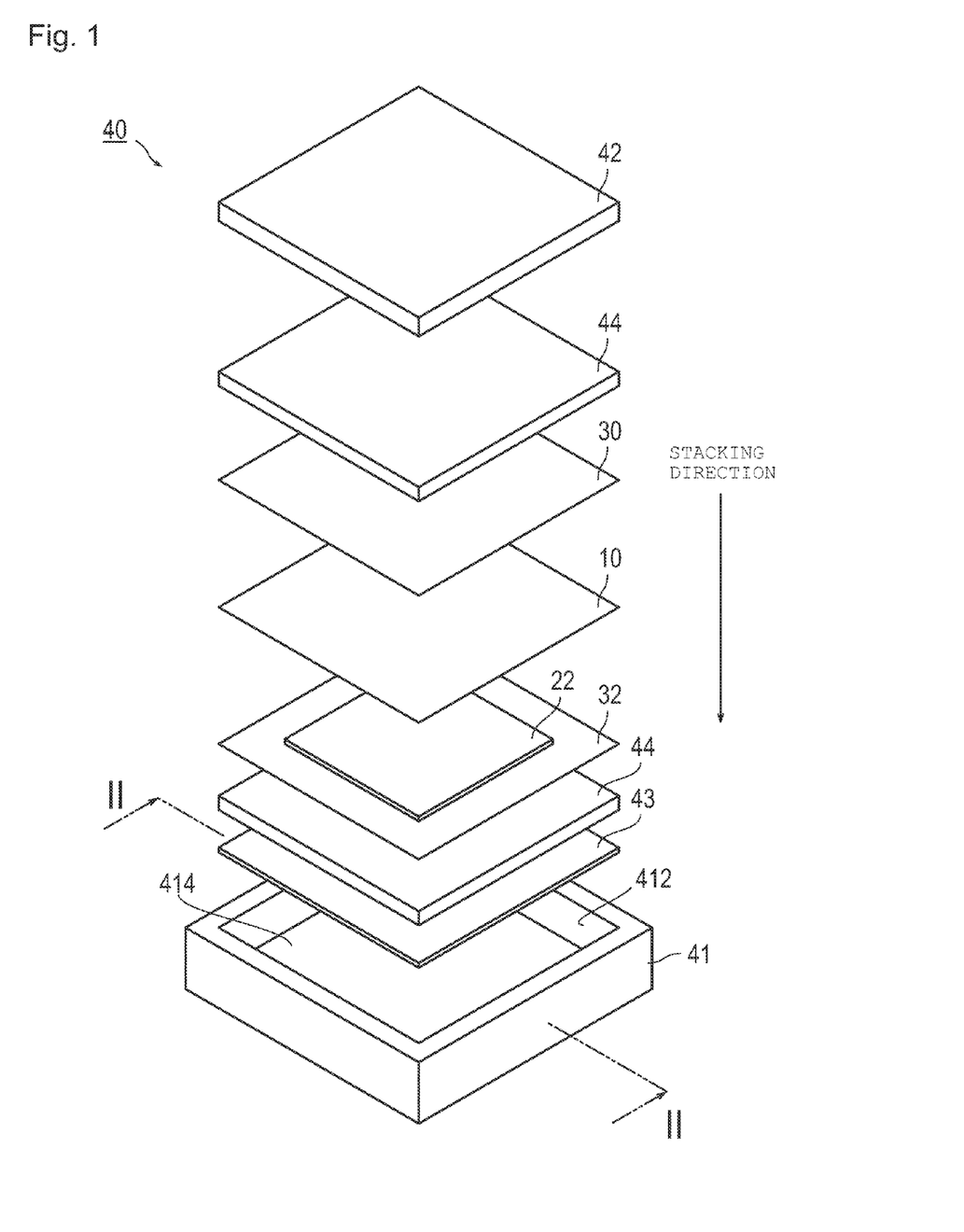
FIG. 1 is a perspective view illustrating a state in which materials constituting an MEA are arranged in a jig used for production of a membrane electrode assembly (MEA).
Figure 2:
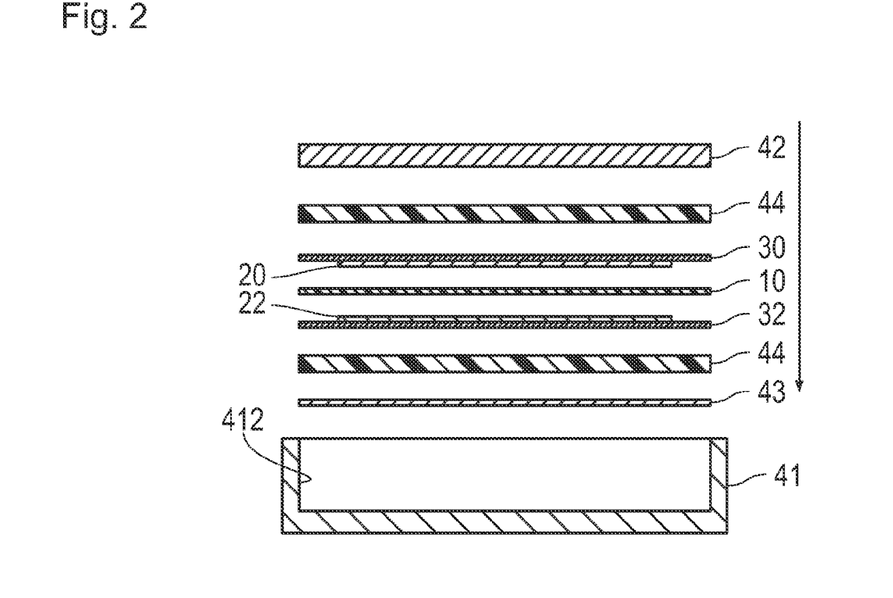
FIG. 2 is a cross-sectional view illustrating the jig and respective materials along a direction of II-II of FIG. 1.

FIG. 1 is a perspective view illustrating a state in which materials constituting an MEA are arranged in a jig used for production of a membrane electrode assembly (MEA) and FIG. 2 is a cross-sectional view illustrating the jig and respective materials along a direction of II-II of FIG. 1.

As illustrated in FIGS. 1 and 2, an electrolyte film 10 and, base materials 30 and 32 whose surfaces have catalyst layers 20 and 22 formed thereon, are arranged (put) in a jig 40.

The catalyst layers 20 and 22 are formed using different catalysts for electrodes, and one layer is a catalyst layer for an anode and the other is a catalyst layer for a cathode. For example, the catalyst layer 20 is a catalyst layer for an anode and the catalyst layer 22 is a catalyst layer for a cathode.

The catalyst layer 20 is held on the base material 30 and the catalyst layer 22 is held on the base material 32. The base materials 30 and 32 are resin films such as Teflon (registered trademark) sheets. The catalyst layers 20 and 22 are formed on the base materials 30 and 32 by performing spray coating or ink coating on the base materials 30 and 32 with an anode catalyst and a cathode catalyst respectively.

The electrolyte film 10 and the base materials 30 and 32 are stacked on the jig 40 such that the catalyst layers 20 and 22 are brought into contact with the electrolyte film 10. The electrolyte film 10 and the base materials 30 and 32 are formed in such as manner as to have the same shape and the same size within a predetermined error margin when seen from the stacking direction.

The jig 40 includes a positioning member 41 and a holding member 42. The positioning member 41 and the holding member 42 are respectively formed of materials such as a metal, for example, iron or the like having sufficient strength and hardness to withstand pressure caused by a pressing apparatus described below.

The positioning member 41 includes a frame-like inner wall 412 which determines positions of the electrolyte film 10 and the base materials 30 and 32 in the plan view such that the electrolyte film 10 and the base materials 30 and 32 are arranged at the same positions when seen from the stacking direction. In other words, the inner wall 412 has a shape that coincides with the outer shapes of the electrolyte film 10 and the base materials 30 and 32 within a predetermined error margin and plays a role of a guide during stacking of the electrolyte film 10 and base materials 30 and 32. An end of the inner wall 412 is closed by a bottom portion 414 in the stacking direction. Further, the inner wall 412 of the positioning member 41 and the bottom portion 414 may be formed so as to be separated from each other. In this case, for example, the positions of the inner wall 412 and the bottom portion 414 may be fixed by an engaging member or may not be fixed.

The holding member 42 has a shape that coincides with the shape of the positioning member 41 and can be placed as a lid on the electrolyte film 10 and the base materials 30 and 32 arranged on the positioning member 41. The holding member 42 holds the electrolyte film 10 and the base materials 30 and 32 by its own weight in the stacking direction together with the positioning member 41. Further, the holding member 42 receives a pressing force from an independent pressing apparatus described below and then transmits the pressing force to the electrolyte film 10 and the base materials 30 and 32.

In the present embodiment, while the electrolyte film 10 and the base materials 30 and 32 are interposed between the positioning member 41 and the holding member 42, a metal bottom plate 43 and a buffering material 44 are arranged in the positioning member 41. The metal bottom plate 43 is initially arranged in the positioning member 41, reinforces the bottom portion 414 of the positioning member 41, and transmits a uniform pressure to the electrolyte film 10 or the like. The buffering material 44 is arranged on the metal bottom plate 43. The buffering material 44 is formed of an elastic body such as urethane or rubber. The buffering material 44 contracts when pressed and presses the catalyst layer 20 toward the electrolyte film 10. The buffering material 44 is arranged between the base material 32 and the holding member 42.

As described above, constituents are sequentially put into the jig 40 in order to transfer the catalyst layers 20 and 22 to the electrolyte film 10 and are positioned in accordance with the inner wall 412 of the positioning member 41 so as to be accommodated in the jig 40.

Figure 3:
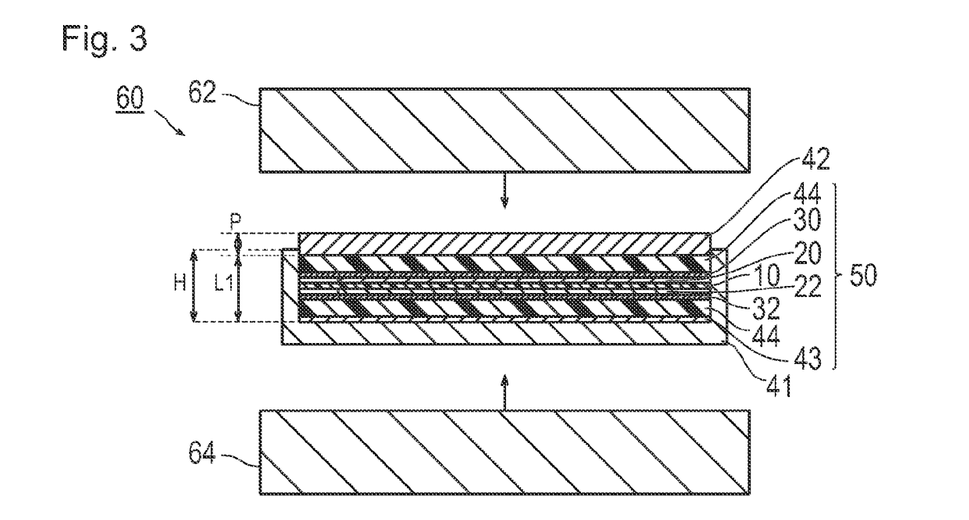
FIG. 3 is a view illustrating a state in which respective configurations for transferring a catalyst layer to an electrolyte film are accommodated in the jig.

FIG. 3 is a view illustrating a state in which respective constituents for transferring the catalyst layer to the electrolyte film are accommodated in the jig.

As illustrated in FIG. 3, in a state where respective constituents such as the electrolyte films 10 and the base materials 30 and 32 are accommodated in the jig 40, the height of the multi-layer body 50 with constituents other than the holding member 42 is shorter than that of the inner wall of the positioning member 41. Therefore, constituents included in the multi-layer body 50 are all appropriately positioned by the positioning member 41. A part of the holding member 42 protrudes to the outside in relation to the inner wall 412 of the positioning member 41. That is, when the height of the inner wall of the positioning member 41 is set as H, the height of the multi-layer body 50 not including the holding member 42 is set as L1, and the thickness of the holding member 42 is set as P, the relationships of "H<L1+P" and "H>L1" are satisfied.

In this state, the jig 40 holding the multi-layer body 50 can be pressed by a pressing apparatus 60 which is different from the jig 40. The jig 40 holding the multi-layer body can be set in the pressing apparatus 60 by a carriage or a robot arm which are not illustrated in the figure.

Figure 4:
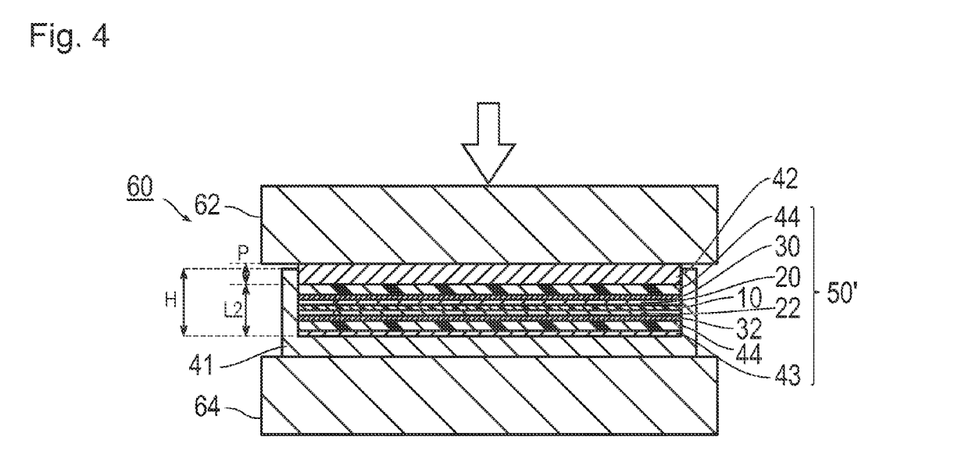
FIG. 4 is a view illustrating a state of performing heat pressing on a multi-layer body in the jig using a pressing apparatus.

FIG. 4 is a view illustrating a state of performing heat pressing on a multi-layer body in the jig using the pressing apparatus.

As illustrated in FIG. 4, the jig 40 is set in the pressing apparatus 60 and then heat-pressed. At least one of upper and lower molds 62 and 64 of the pressing apparatus 60 is configured so as to be heated at a predetermined temperature during heat pressing. As configurations for heating the mold 62 and/or mold 64, for example, an electric heating wire arranged in a mold or a distribution channel formed in a mold for distribution of a medium such as warm air can be used. In addition, a temperature sensor measuring a temperature is provided in at least one of the molds 62 and 64. The temperature sensor can measure the temperature of the multi-layer body 50 in the jig 40 by measuring the temperature in a mold.

When pressing is performed by the pressing apparatus 60, the buffering material 44 contracts as illustrated as a multi-layer body 50' of FIG. 4, and the pressure is uniformly transferred to the catalyst layers 20 and 22 on the electrolyte film 10 and the base materials 30 and 32. Here, when the height of the inner wall of the positioning member 41 is set as H, the height of the compressed multi-layer body 50 is set as L2, and the thickness of the holding member 42 is set as P, a relationship of "H≤L2+P" is satisfied. It is preferable to design the thickness of the holding member 42 or the buffering material 44 so as to obtain sufficient pressing force to transfer the catalyst layers 20 and 22 to the electrolyte film 10 when the relationship of "H≤L2+P" is satisfied. In this manner, the mold 62 is made to abut against the positioning member 41 at the time when the pressure reaches a desired pressure so that excessive compression can be prevented.

As described above, the catalyst layers 20 and 22 are transfer-printed onto the electrolyte film 10 by arranging necessary constituents in the jig 40 and then performing heat pressing thereon. Here, in the present embodiment, the pressure, temperature, and time during the heat pressing are managed. Hereinafter, pressure and temperature management will be described.

Figure 5:
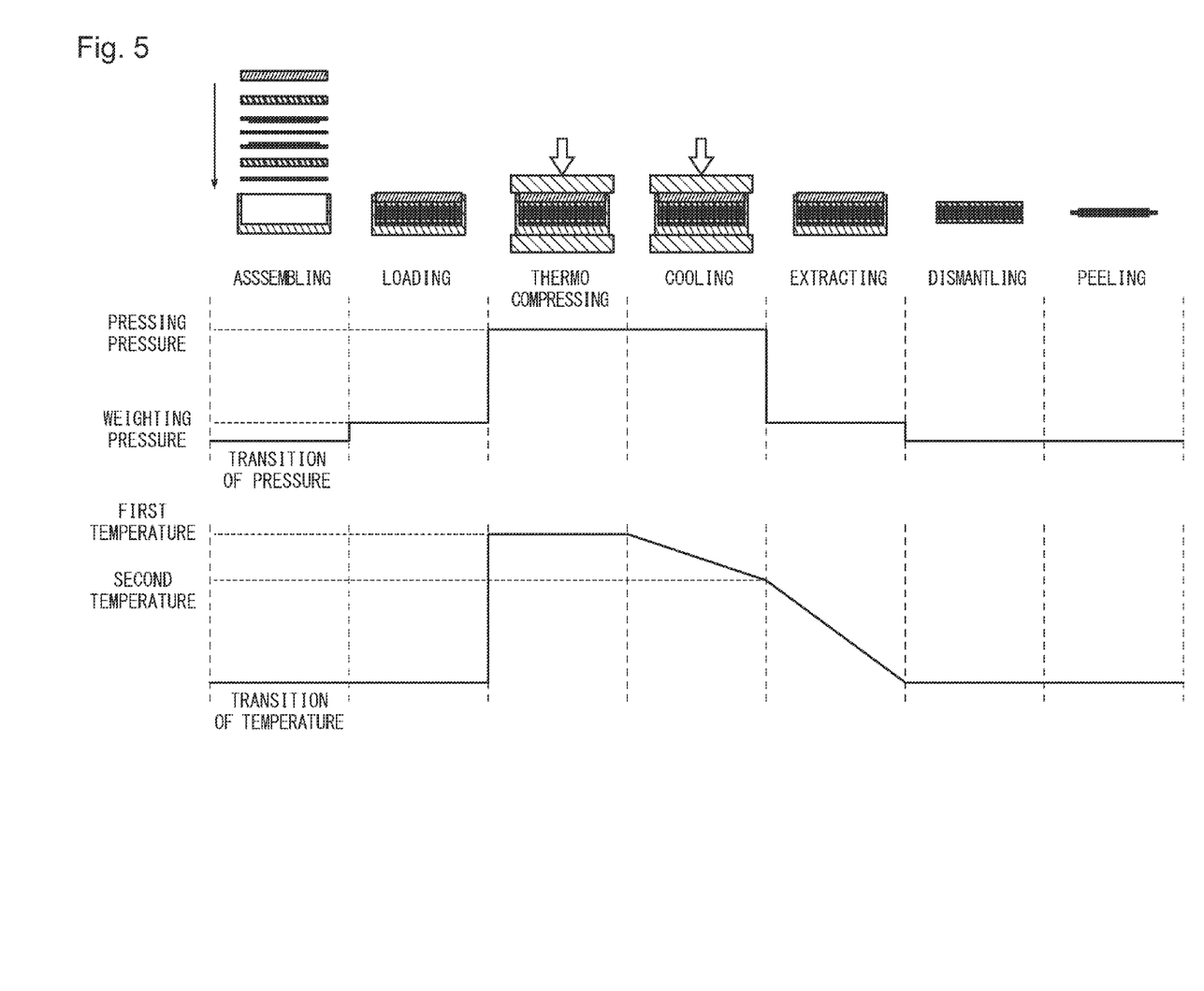
FIG. 5 is a view illustrating transition of a pressure and a temperature during the transfer of the catalyst layer using heat pressing.

FIG. 5 is a view illustrating transition of the pressure and the temperature during the transfer of the catalyst layer using heat pressing. In FIG. 5, transfer of the catalyst layer is shown in order of processes in the upper stage, transition of the pressure applied to the multi-layer body 50 (50') is shown in the middle stage, and transition of the temperature of the multi-layer body 50 (50') is shown in the lower stage.

First, in an assembling process, constituents such as the electrolyte film 10 and the base materials 30 and 32 on which the catalyst layers 20 and 22 are formed are arranged in the jig 40. At this time, pressure is not applied to the multi-layer body 50 such as the electrolyte film 10 or the like and the multi-layer body is not heated either. The assembling process may be automatically performed by a robot or a transportation apparatus or manually performed by an operator.

In a loading process, arrangement of all of the constituents in the jig 40 is completed. All of the constituents are positioned by the positioning member 41 at certain positions when seen in the stacking direction. At the time when the loading process is completed, the pressure caused by the weight of the holding member 42 is applied to the multi-layer body 50 in the jig 40. The multi-layer body 50 is not heated.

After completion of the loading process, the jig 40 is set in the pressing apparatus 60 and then heat-pressed from both sides of the molds 62 and 64 in the stacking direction in a thermocompressing process. In this process, the multi-layer body 50 is pressed by a predetermined pressure sufficient enough for the catalyst layers 20 and 22 to be transferred from the base materials 30 and 32 to the electrolyte film 10 for a predetermined time. The pressure and the time are not particularly limited as long as the electrolyte film 10 and the catalyst layers 20 and 22 can be bonded to one another in a sufficiently close contact manner, but the pressing force is preferably in a range of 0.5 MPa to 5 MPa with respect to the electrode surfaces and the pressing time is preferably in a range of 1 minute to 10 minutes. Accordingly, the bondability among the electrolyte film 10 and the catalyst layers 20 and 22 can be improved. Moreover, the heating temperature with respect to the multi-layer body 50 from the mold 62 or the like is a first temperature sufficient enough for the catalyst layers to be transferred to the electrolyte film 10 from the base materials 30 and 32. The first temperature is 100° C. or higher and also a temperature lower than or equal to the softening point of the electrolyte film 10. The multi-layer body 50 may be heated to the first temperature before the pressing is started or while the pressing is performed.

When the thermocompressing process is completed, the heating with respect to the multi-layer body 50 is stopped while the pressing force by the pressing apparatus 60 is maintained in a cooling process. Since the pressing force is maintained, the jig 40 is continuously in a state of being pressed from both sides of the molds 62 and 64 in the stacking direction. Here, since heat still remains although the heating due to the molds 62 and 64 is stopped, heat is gradually radiated from the multi-layer body 50. While the compression is maintained, the temperature of the heated molds 62 and 64 is measured by a temperature sensor. The compression is maintained until the temperature of the molds 62 and 64 is lowered to a second temperature. The second temperature is higher than or equal to room temperature (for example, 28° C.) and is a temperature lower than the first temperature.

When the temperature thereof is decreased to the second temperature, compression by the pressing apparatus 60 is stopped and the jig 40 including the multi-layer body 50 is extracted from the pressing apparatus 60 in the extracting process. The extracted jig 40 is stored in a storage location other than the pressing apparatus 60. Since the multi-layer body 50 is released from the compression by the pressing apparatus 60 and the remaining heat of the molds of 62 and 64 does not affect the multi-layer body 50 any more, the multi-layer body 50 is more rapidly cooled when compared with the case of the cooling process. The pressing force on the multi-layer body 50 due to the weight of the holding member 42 of the jig 40 remains.

After the extracting process, the multi-layer body 50 is extracted from the jig 40 in a dismantling process. A load of the pressure is not applied to the multi-layer body 50.

Next, in a peeling process, the buffering material 44 is removed from the multi-layer body 50 and then the base materials 30 and 32 are peeled. The catalyst layers 20 and 22 are transferred to the electrolyte film 10 and peeled from the base materials 30 and 32 so as to remain on the electrolyte film 10.

As described above, the temperature at the time of transfer printing and parameters such as a holding time of the pressure are important for transfer printing of a desired catalyst layer. The present inventors found that transfer failure of the catalyst layer does not occur and the catalyst layer can be appropriately transferred when the temperature at the time of transfer printing and the holding time of the pressure are managed and the present inventors controlled the temperature and/or the pressure using the above-described parameters.

The embodiments described above have the following effects.

In the present embodiment, since heat pressing is continued at the first temperature until a predetermined time passes, the catalyst layers 20 and 22 can be reliably transfer-printed on the electrolyte film 10. Further, since the first temperature is set lower than or equal to the softening point of the electrolyte film 10, materials are not melted because of the electrolyte film 10 being extremely softened, and it is possible to prevent the MEA from being a defective product. Since the first temperature is set to be higher than or equal to 100° C., remaining moisture in the electrolyte film 10 is not markedly increased by the relative humidity of the electrolyte film 10 being markedly increased. It is possible to prevent generation of transfer failure of the catalyst layers 20 and 22 because of the influence of remaining moisture.

Moreover, in the present embodiment, after the heat pressing has been completed at the first temperature, the heating is stopped and pressing is continued until the temperature falls to the second temperature due to cooling. Therefore, since the pressing is continued while the electrolyte film 10 or the like contracts due to cooling, stable transfer printing can be realized without deformation of the electrolyte film 10 and the catalyst films 20 and 22. Since the second temperature is set to be lower than the first temperature, the cooling is performed until the shapes of the electrolyte film 10 and the catalyst films 20 and 22 are stabilized so that the catalyst layer 20 is reliably fixed to the electrolyte film 10. Further, since the second temperature is set to be higher than or equal to room temperature, the electrolyte film 10 does not become swollen due to dew condensation by the relative temperature being markedly increased, and thus, compression on the swollen electrolyte film 10 does not happen. As a result, it is possible to prevent the electrolyte film 10 and the catalyst layers 20 and 22 from being unstably bonded to one another by pressing the swollen catalyst.

When the cooling is completed, the jig 40 is stored at a storage location other than the pressing apparatus 60 until the temperature drops to room temperature more gently than the temperature drop during the cooling process. In the extracting process, since the heat-pressed jig 40 does not occupy the pressing apparatus 60, the thermocompressing process and the cooling process can be performed by setting the jig 40 accommodating a different multi-layer body 50 in the pressing apparatus 60 for subsequent heat pressing. The processes can be performed in parallel so that production efficiency can be improved.

The positioning member 41 of the jig 40 includes the inner wall 412 whose configuration coincides with each of the configurations of the electrolyte film 10 and the base materials 30 and 32 included in the multi-layer body 50. Accordingly, each of the configurations are arranged in the positioning member 41 while being guided by the inner wall 412 and accurately positioned at the same positions when seen from the stacking direction. In the state of being accurately positioned, since the holding member 42 is guided by the inner wall 412 and the pressing force of the pressing apparatus 60 is transmitted, the catalyst layers 20 and 22 can be reliably transferred to accurate positions on the electrolyte film 10.

Moreover, in the above-described embodiments, the temperature and the pressure during the heat pressing and after heat pressing are controlled. In regard to a member constituting the MEA, a known configuration in the related art in the field of fuel cells can be employed as it is or through appropriate modification. Hereinafter, typical modes of the electrolyte film and the catalyst layer will be described for reference, but the technical scope of the present invention is not limited to the modes described below.

[Catalyst layer] The catalyst layer is a layer in which a reaction practically advances. Specifically, an oxidation reaction of hydrogen progresses in the catalyst layer on the anode side and a reduction reaction of oxygen progresses in the catalyst layer on the cathode side. The catalyst layer includes a catalyst component, a conductive carrier which carries the catalyst component, and a polymer electrolyte having protonic conductivity.

The catalyst component used for the catalyst layer on the anode side is not particularly limited as long as the catalyst component has a catalyst action together with the oxidation reaction of hydrogen and a known catalyst can be used in the same manner. Further, the catalyst component used for the catalyst layer on the cathode side is not particularly limited as long as the catalyst component has a catalyst action together with the reduction reaction of oxygen and a known catalyst can be used in the same manner. Specifically, the catalyst component can be selected from metals such as platinum, ruthenium, iridium, rhodium, palladium, osumium, tungsten, lead, iron, chromium, cobalt, nickel, manganese, vanadium, molybdenum, gallium, and aluminum, and alloys of these. However, other materials can be used. Among these, it is preferable to at least include platinum for improvement of catalyst activity, poisoning resistance with respect to carbon monoxide or the like, and heat resistance. The composition of the alloy depends on the kind of metal to be alloyed, but platinum may be in a range of 30 atomic % to 90 atomic % and a metal to be alloyed may be in a range of 10 atomic % to 70 atomic %. The composition of an alloy in a case where an alloy is used as a catalyst on the cathode side varies due to the kind of metal to be alloyed and can be appropriately selected by a person skilled in the art, but it is preferable that platinum be in a range of 30 atomic % to 90 atomic % and another metal to be alloyed be in a range of 10 atomic % to 70 atomic %. Moreover, an alloy is obtained by adding one or more kinds of metallic elements or non-metallic elements to a metallic element in general and is a general expression for elements having metallic properties. In regard to the compositions of alloys, a eutectic alloy whose component elements are individual crystals, that is, a so-called mixture, an alloy whose component elements totally mixed so as to form a solid dispersion, and an alloy whose component elements form an intermetallic compound or a compound of a metal and a non-metal can be used, and whichever may be used in the present application. At this time, the catalyst component used for the anode catalyst layer and the catalyst component used for the cathode catalyst layer can be appropriately selected from the above. In the description of the present specification, unless otherwise noted, the description of the catalyst component for the anode catalyst layer is the same as the description of the catalyst component for the cathode catalyst layer, and both of the catalyst components are collectively referred to as a "catalyst component." However, the catalyst components of the anode catalyst layer and the cathode catalyst layer are not necessarily the same and can be appropriately selected such that the above-described preferable effects can be exhibited.

The shape and size of the catalyst component are not particularly limited and a shape and size which are the same as those of a known catalyst component can be used, but it is preferable that the catalyst component be granular. At this time, the average particle diameter of catalyst particles is preferably in a range of 1 nm to 30 nm, more preferably in a range of 1.5 nm to 20 nm, still more preferably in a range of 2 nm to 10 nm, and particularly preferably in a range of 2 nm to 5 nm. When the average particle diameter of catalyst particles is within the range described above, the balance between a catalyst utilization rate related to an effective electrode area in which an electrochemical reaction progresses and simplicity of carrying can be appropriately controlled. Further, the "average particle diameter of the catalyst particles" in the present invention can be measured as an average value between a crystallite diameter acquired by a half width of a diffraction peak of the catalyst component in X-ray diffraction and a particle diameter of the catalyst component examined by a transmission electron microscope.

The conductive carrier functions as a carrier for carrying the above-described catalyst components and as an electron conduction path that is involved in transferring electrons with the catalyst component.

The conductive carrier is not particularly limited as long as the conductive carrier has a specific surface area for carrying the catalyst component in a desired dispersion state and has sufficient electron conductivity, and a carbon-based material whose main component is carbon is preferable. Specific examples thereof include carbon particles made of carbon black, carbon black to which a graphitization treatment is applied, activated carbon, coke, natural graphite, artificial graphite, carbon nanotubes, carbon nanohorn, and a carbon fibril structure. Further, the expression "main component is carbon" means that carbon atom is included as main component. This concept includes both cases that component made only from carbon atoms and that component made substantially from carbon atoms. In some cases, elements other than carbon atoms may be included for improvement of characteristics of the fuel cell. Further, the expression "made substantially from carbon atoms" means that a mixture of impurities in a range of approximately 2% by mass to 3% by mass may be admitted.

The BET nitrogen specific surface area of the conductive carrier may be a surface area sufficient for carrying the catalyst component with high dispersity, but is preferably in a range of 20 m²/g to 1600 m²/g and more preferably in a range of 80 m²/g to 1200 m²/g. When the specific surface area of the conductive carrier is within the above-described range, the balance between dispersibility of the catalyst component on the conductive carrier and an effective utilization ratio of the catalyst component can be appropriately controlled.

The size of the conductive carrier is not particularly limited, but the average particle diameter of primary particles is in a range of 5 nm to 200 nm and preferably in a range of approximately 10 nm to 100 nm from viewpoints of simplicity of carrying, the catalyst utilization rate, and controlling the thickness of the electrode catalyst layer to be in an appropriate range.

In the electrode catalyst, the carrying amount of the catalyst component is preferably in a range of 10% by mass to 80% by mass and more preferably in a range of 30% by mass to 70% by mass. When the carrying amount of the catalyst component is in the above-described range, the balance between dispersity of the catalyst component on the conductive carrier and catalyst performance can be appropriately controlled. Further, the carrying amount of the catalyst component can be measured by inductively coupled plasma emission spectroscopy (ICP).

Moreover, carriage of the catalyst component to the carrier can be performed by a known method. For example, a known method such as an impregnation method, a liquid-phase reduction carrying method, an evaporation drying method, a colloid adsorption method, an atomized pyrolysis method, or a reversed micelle method (microemulsion method) can be used.

In the present invention, a commercially available product may be used for the electrode catalyst. Examples of the commercially available product include an electrode catalyst manufactured by Tanaka Kikinzoku Kogyo Co., Ltd., NE Chemcat Corporation, E-TEK, Inc., Johnson Matthey and so on. These electrode catalysts are obtained by carrying (carrying concentration of the kind of catalyst, in a range of 20% by mass to 70% by mass) platinum or a platinum alloy using a carbon carrier. In the description above, examples of the carbon carrier include Ketjenblack, vulcane, acetylene black, black pearl, a graphitization treated carbon carrier to which a heat treatment is applied in advance at a high temperature (for example, a graphitization treated Ketjenblack), carbon nanotubes, carbon nanohorn, carbon fibers, and mesoporous carbon.

As described above, it is preferable that the BET nitrogen specific surface area of the electrode catalyst be larger than the BET specific surface area of a conductive material contained in a hydrophilic porous layer. Further, as described above, it is preferable that the thickness of the catalyst layer be larger than the thickness of an adjacent hydrophilic porous layer.

The catalyst layer includes a polymer electrolyte having ion conductivity in addition to the electrode catalyst. The polymer electrolyte is not particularly limited and can be appropriately referred to known knowledge in the related art. For example, an ion exchange resin constituting the above-described polymer electrolyte film may be added to the catalyst layer as the polymer electrolyte. In a case where the catalyst layer is the hydrophilic porous layer, the polymer electrolyte can be used as an ion conductive material.

The thickness of the catalyst layer is not particularly limited as long as catalyst actions of an oxidation reaction (anode side) of hydrogen and a reduction reaction (cathode side) of oxygen can be sufficiently exhibited, and the same thickness as that of the related art can be used. Specifically, the thickness of each catalyst layer is preferably in a range of 1 μm to 10 μm. Further, a method of coating the base material with a catalyst ink is not particularly limited and a known method such as a screen printing method, a deposition method, or a spray method can be applied in the same manner.

A known sheet, for example, a polyester sheet such as a PTFE (polytetrafluoroethylene) sheet or a PET (polyethylene terephthalate) sheet can be used as the base material. Further, the base material can be appropriately selected according to the kind of a catalyst ink (particularly, conductive carrier such as carbon in an ink) to be used.

[Electrolyte film] The electrolyte film has a function of allowing protons, made of an ion exchange resin, generated in the catalyst layer on the anode side to selectively pass through the catalyst layer on the cathode side along the film thickness direction at the time of operation of the PEFC. Further, the electrolyte film also has a function as a partition wall for not allowing fuel gas supplied to the anode side and oxidant gas supplied to the cathode side to be mixed with each other.

The specific configuration of the electrolyte film is not particularly limited, and a known electrolyte film in the related art in the field of the fuel cell can be appropriately employed. The kind of the electrolyte film is largely divided into a fluorine-based polymer electrolyte film and a hydrocarbon-based polymer electrolyte film according to the kind of the ion exchange resin which is a constituent material. Examples of the ion exchange resin constituting a fluorine-based polymer electrolyte film include a perfluorocarbon sulfonic acid-based polymer such as Nafion (registered trademark, manufactured by Du Pont Kabushiki Kasha), Aciplex (registered trademark, manufactured by Asahi Kasei Corporation), or Flemion (registered trademark, manufactured by Asahi Glass Co., Ltd.); a perfluorocarbon phosphonic acid-based polymer, a trifluorostyrene sulfonic acid-based polymer, an ethylene tetrafluoroethylene-g-styrene sulfonic acid-based polymer, an ethylene-tetrafluoroethylene copolymer, and a polyvinylidene fluoride perfluorocarbon sulfonic acid-based polymer. From a viewpoint of power generation performance such as heat resistance or chemical stability, a fluorine-based polymer electrolyte film is preferably used and a fluorine-based polymer electrolyte film made of a perfluorocarbon sulfonic acid-based polymer is particularly preferably used.

Specific examples of the hydrocarbon-based electrolyte include sulfonated polyether sulfone (S-PES), sulfonated polyaryl ether ketone, solfonated polybenzimidazole alkyl, phosphonated polybenzimidazole alkyl, sulfonated polystyrene, sulfonated polyether ether ketone (S-PEEK), and sulfonated polyphenylene (S-PPP). From viewpoints of production, for example, a simple production process because of low cost raw materials and high selectivity of materials, the hydrocarbon-based polymer electrolyte film is preferably used. Further, the above-described ion exchange resin can be used alone or in combination of two or more kinds thereof. In addition, materials are not limited to the above-described materials and other materials can be used.

The thickness of the electrolyte film may be appropriately determined in consideration of characteristics of the obtained MEA or PEFC and is not particularly limited. However, the thickness of the polymer electrolyte film is preferably in a range of 5 μm to 300 μm, more preferably in a range of 10 μm to 200 μm, and still more preferably in a range of 15 μm to 150 μm. When the thickness thereof is in the above-described range, the balance between strength at the time of film formation or durability at the time of usage and output characteristics at the time of usage can be appropriately controlled.

The invention claimed is:

1. A method of transferring a catalyst layer, comprising:
a process of forming a multi-layer body in a positioning member, wherein the positioning member includes a bottom portion and a frame-like inner wall rising from the bottom portion that receives the multi-layer body, by stacking base materials and an electrolyte film on one another such that catalyst layers formed on the base materials are brought into contact with the electrolyte film;
a process of setting a holding member on the multi-layer body to interpose the multi-layer body between the holding member and positioning member, the holding member having a same shape and size as the electrolyte film and the base materials;
pressing all components of the multi-layer body by transmitting pressing force from a pressing apparatus through the holding member from a stacking direction;
a process of heating the multi-layer body to a first temperature;
a process of stopping the heating after a predetermined time passes from when pressing is started;
a process of stopping pressing performed by the pressing apparatus when the temperature of the catalyst layers becomes a second temperature or lower, which is a temperature lower than the first temperature and higher than room temperature, after the heating is stopped; and
a process of removing the multi-layer body from the pressing apparatus and storing the multi-layer body with all components of the multi-layer body being subject to a weight of the holding member in a different storage location whose temperature is set to room temperature lower than or equal to the second temperature.

2. The method of transferring a catalyst layer according to claim 1, wherein the first temperature is set in a range of 100° C. to a temperature of a softening point of the electrolyte film.

3. The method of transferring a catalyst layer according to claim 1, wherein the thickness of the multi-layer body before pressing is smaller than the height of the inner wall, and
the total of the thickness of the holding member and the thickness of the multi-layer body before pressing is greater than the height of the inner wall.

4. The method of transferring a catalyst layer according to claim 3, wherein the height of the inner wall is set such that pressing force necessary for transferring the catalyst layer to the electrolyte film is obtained at the time when the height of the inner wall and the total of the thickness of the multi-layer body after pressing and the thickness of the holding member become equal to each other.

* * * * *